United States Patent [19]

Louveaux et al.

[11] 4,081,556

[45] Mar. 28, 1978

[54] PRODUCT FOR FEEDING BEES

[75] Inventors: Jean-Louis Louveaux, Bures sur Yvette; Danielle LeJolly nee Vereecque, Massat; Michel Huchette, Lestrem, all of France

[73] Assignee: Institut National de la Recherche Agronomique, Paris, France

[21] Appl. No.: 692,920

[22] Filed: Jun. 4, 1976

[30] Foreign Application Priority Data

Jun. 6, 1975 France .................................. 75 17797
Feb. 25, 1976 France .................................. 76 05271

[51] Int. Cl.$^2$ ................................................ A23K 1/00
[52] U.S. Cl. ........................................... 426/2; 426/72; 426/656; 426/658
[58] Field of Search ............................. 426/2, 52–54, 426/72, 656, 658; 119/1, 6; 6/5, 12 M; 195/100, 31 R

[56] References Cited

U.S. PATENT DOCUMENTS 2,891,869 6/1959 Langlois ............................. 195/31 R
2,895,829 7/1959 Feo et al. ............................. 426/658

FOREIGN PATENT DOCUMENTS 1,932,225 6/1970 Germany ............................. 426/658

OTHER PUBLICATIONS

Rose et al "The Condensed Chemical Dictionary" Van Nostrand Reinhold Co 1970, pp. 287, 432, 902, 450, 506–507.
Whistler et al "Starch Chemistry & Technology" Academic Press 1967, pp. 30–39.

*Primary Examiner*—R. B. Penland
*Attorney, Agent, or Firm*—Larson, Taylor and Hinds

[57] ABSTRACT

The invention relates to a feeding product for bees.

The product according to the invention is characterized by the fact that it comprises a syrup of maltose obtained by enzymatic hydrolysis of starch and containing a proportion of maltose such that the product does not crystallize, said product being free from substances toxic to bees. The feeding product may also be enriched with an effective amount of maize steeping water or liquor.

13 Claims, No Drawings

PRODUCT FOR FEEDING BEES

Up to now, for feeding bees, bees-keepers have resorted either to pure honey or to saccharose, the latter being used most often in the form of syrup or else in the state of crystallized sugar or "candy".

In view of the world shortage of saccharose, a more and more acute need for less costly and more readily accessible substitutes is making itself felt.

Theoretically, the solution of this problem should not have raised difficulties, since sweetening substances originating from the hydrolysis of starch ought to constitute a priori ready substitutes for saccharose.

In reality, the difficulties encountered by the research worker who proposes to find a substitute for saccharose which can be used in apiculture are considerable, such a product being suitable for feeding bees only if it is simultaneously:

tempting,
devoid of toxicity,
digestible by bees without leaving considerable waste,
not crystallizable or crystallizes, at the very most, in a soft pasty form.

It is only by means of conscientious and thorough experimenting that the inventors, who are experts in the technical field considered, have been able to rule out all the substitutes being offered to the user and select the product according to the invention, which conforms with the above-mentioned set of properties.

The tests used in the course of the aforesaid experiments comprise laboratory tests and open air tests.

The tests carried out in the laboratory consist in feeding batches of 50 encaged bees with the product to be tested. The dimensions of the cages used are 8.5 × 10 × 6 cm. They are kept in an oven at 30° and they contain a fragment of constructed honeycomb in which the bees can store the product offered to them. Account being taken of the deaths, the half-length of life of the batch of bees is calculated. This is equal to the number of days which elapse between the commencement of the test and the death of 50% of the population of the cage. The bees used are either new-born bees or workers of indeterminate age when it is a question of tests of short duration. The controls are batches of bees fed on saccharose syrup.

The tests carried out in the open air take place in the apiary on colonies having a queen and a population sufficient to cover five Dadant frames (it is called to mind that the Dadant frame is a standard frame of 27 × 42 cm) at the end of the summer. In these hives, the stocks of honey are entirely replaced by stocks formed from the product to be tested, which the bees come and take from the food chamber. The value of the product forming the subject of the test is estimated from the condition of the colony at the end of wintering.

It was at the conclusion of these long and difficult tests, during which the majority of the sweetening products open to being considered, among them pure maltose, were finally eliminated for various reasons, that the inventors ultimately retained as usable only syrups originating from the enzymatic hydrolysis of starch and containing maltose, these syrups being free from toxic substances such as hydroxymethylfurfural.

Consequently, the product according to the invention for feeding bees is characterized by the fact that it comprises a syrup of maltose obtained by enzymatic hydrolysis of starch and having a proportion of maltose such that the product does not crystallize, the said product being free from toxic substances and its contents of polysaccharides, mineral substances and reversion products being below the values starting from which these substances are no longer tolerated by bees.

According to an advantageous embodiment, the feeding product according to the invention comprises, besides the aforesaid syrup of maltose, a product compatible with the latter and satisfying the same conditions of acceptability by bees, and this product may be a syrup rich in glucose, glucose isomerized glucose, fructose, or again saccharose, the amount of syrup of maltose being sufficient for the feeding product not to crystallize.

More particularly, the maltose syrups used for the preparation of the feeding products according to the invention comprise a proportion of maltose of at least about 40 to 45%, but lower than the proportion from which the product would crystallize through excess of maltose, the said product moreover comprising maltotriose, glucose, isomaltose and polysaccharides (complex sugars containing more than three molecules of simple sugar or hexoses).

The content of mineral substances (in particular K, Na, Ca, Fe) in these syrups is chosen below 1% and preferably in the vicinity of 0.1%; their content of isomaltose is preferably below 3%; their content of maltotriose does not have any imperative limit, because this substance is digested by bees, as the tests have shown, and their content of polysaccharides is all the smaller the higher their molecular weight, their digestibility decreasing when the molecular weight increases.

According to another characteristic of the invention, the feeding product has a water content in the vicinity of that of natural honeys, that is to say ranging between 15 and 25% and preferably of the order of 20%. By adjusting the water content of the feeding product to that of natural honey, the bees are spared the work of concentration and in this way their activity is increased. The degree of humidity in the hive is moreover reduced, which is favourable to the health of the bees.

Of course, a higher water content may be used when this is preferable. In Spring in particular, it is preferable to have a more stimulating product; to this end, a product whose water content is about 30% is used. The transition from a concentrated product to a more dilute product may be obtained by simply adding water in adequate proportion.

The feeding products according to the invention having a low water content show a consistency similar to that of honey. They do not crystallize, even at temperatures of the order of 4° C. Their viscosity decreases in a hot state, which can facilitate their handling. By very reason of their low water content, the keep well and do not normally give rise to fermentation phenomena. Nevertheless, it is possible to add a preservative, for example potassium sorbate, at the rate of about 0.4 g per liter of product.

A product according to the invention for feeding bees which has given good results and hereinafter called "Syrup A" comprises an effective amount of maltose syrup originating from an enzymatic hydrolysate of maize starch and having the following composition in dry substance:

| | |
|---|---|
| maltose | 68% |
| maltotriose | 21% |
| glucose | 2.5% |

| | |
|---|---|
| -continued | |
| polysaccharides | 8%. |

Still better results have been obtained with feeding products which comprise, besides the aforesaid Syrup A or an equivalent syrup, a syrup rich in glucose, or glucose, in particular isomerized glucose, the proportion of maltose syrup being always sufficient to avoid crystallization of the mixture; these products may moreover contain saccharose.

An example of such a product according to the invention ($A_1$) is made up of a mixture consisting as to two thirds of the maltose syrup (A), the composition of which is given above, and as to one third of syrup in which 95% of the dry substance consists of dextrose, the water content of this mixture being about 20%. In the dry substance of this product, the maltose content is therefore 46% and that of dextrose is 30%.

In order to prepare the aforesaid maltose syrups entering into the composition of the feeding product according to the invention, it is possible:

either to enrich a starch hydrolysate obtained by successive action of an α-amylase and a β-amylase and which contains in the order of 55% of maltose and of 35 to 40% of limit dextrins by resorting to the fractionation process forming the subject-matter of French Patent no. 6,925,784 filed by the Company ROQUETTE FRERES on the 28on the July 28, 1969 under the title "Process for treating starch hydrolysates and corresponding hydrogenated products", owing to which a concentration of maltose of the order of 77 to 85% in the final product is easily achieved;

or else to subject a starch hydrolysate obtained by the action of an α-amylase on starch to a treatment by means of different maltose-producing α-1,6-glucosidase enzymes, for example pullulanase or the isoamylase associated most often with β-amylase.

The maltose syrups entering into the composition of the feeding product according to the invention are very tempting, do not crystallize even after keeping for several months at 5° C (whereas pure maltose and those syrups in which the proportion of the maltose with respect to the glucose becomes too low crystallize readily), and are well digested by bees.

In a particularly preferred embodiment of the present invention, the feeding products for bees have in their composition, in addition to the carbohydrates, substances useful for feeding bees and favourable to their growth and which are found in the composition of natural honeys, namely essentially amino acids, vitamins, carboxylic acids and proteins, the proportions of these substances in the feeding products being in the vicinity of those of these same substances in natural honeys.

To this end, there is introduced into the feeding product formed for the major part of carbohydrates (glucose, maltose, saccharose isomerized glucose, etc.), an effective amount of maize steeping water of the kind of the liquors originating from the maceration carried out in conventional starch manufacturing processes; it is likewise possible to resort to a product derived from the aforesaid steeping water or liquors.

According to the invention, it is also possible to prepare a feeding product from a syrup of carbohydrates such as saccharose or isomerized glucose, or again from a mixture of these, and by adding an effective amount of maize steeping water.

In fact, maize steeping water contains a large variety of substances and in particular amino acids, proteins, mineral salts, vitamins and organic acids. This steeping water is the site of a natural fermentation essentially of lactic type. According to whether the process of fermentation is more or less advanced, the composition of the steeping water varies substantially. In particular, in the course of the development of the fermentation, the content of reducing sugars decreases, whereas the content of acids increases, just as the proportion of the nitrogen of the amino acids with respect to the total nitrogen.

According to the invention, there is used with advantage a steeping water the fermentation of which is sufficiently advanced for the content of reducing sugars to be very limited. This content is preferably less than 2.5% by weight of the total dry substance of the steeping water.

Advantageously, in order to simplify the problems of storage and transport, the steeping water is concentrated in such a manner that its content of dry substances is increased. In order to avoid the risks of degradation of the most fragile constituents of these steeping liquors, the concentration is usually effected by evaporation at reduced pressure and at temperatures not exceeding 60° to 70° C. Thus, steeping liquors are used in which the content of dry substances ranges between about 45 and 55%. When the steeping liquor or water concentrated in this way is used, the proportion introduced into the feeding product is advantageously between 0.5 and 5% by weight of the final product and preferably about 1% to 2%. A preferred product ($A_2$) according to the invention is composed of the syrup mixture $A_1$ to which are added amounts of maize steeping water, in particular of the aforementioned type (in which the content of dry substances is 50%), equivalent to 1 to 2% of the total composition. The composition of this feeding product according to the invention has a marked analogy with that of natural honeys. This is certainly shown by the following comparison of a honey and a feeding product according to the invention into which 1% of concentrated steeping water containing 50% of dry substances has been incorporated (Table I).

Table I

| | Honey % | Feeding Product (%) |
|---|---|---|
| water | 18 | 20 |
| carbohydrates | 80 | 79.20 |
| proteins | 0.26 | 0.23 |
| amino acids | 0.11 | 0.23 |
| mineral substances | 0.20 | 0.10 |
| total acids | 1.20 | 0.12 |
| various | 0.23 | 0.12 |
| pH | 3.9 | 4.1 |

The following tests illustrate the invention. They were carried out under the conditions hereinbefore described.

1. Maltose syrup (A)

A first test carried out in August enabled it to be determined that the half-length of life was 39 days against 40.5 for the controls (saccharose syrup).

A second test carried out in September enabled it to be determined that the half-length of life was 51 days against 56 days for the controls, the difference not being statistically significant.

2. Maltose + dextrose syrup (A₁)

The tests carried out in the laboratory with the aforesaid composition consisting as to ⅔ of maltose syrup and as to ⅓ of dextrose syrup (Syrup A₁) in the month of March enabled a half-length of life of 50.3 days to be recorded, the half-length of life of the controls being 49.6 days.

3. Long-term tests

The tests carried out in the apiary during Autumn and Winter showed that colonies which have wintered on stores constituted by maltose syrups exhibit substantially the same state of development as colonies wintered on saccharose. The maltose syrup used was picked up very rapidly by the bees, which shows its good temptingness.

4. Maltose + dextrose syrup + steeping water (A₂)

In the following tests, for which the feeding products were enriched with maize steeping water, the control batches were fed with the non-enriched products (A₁).

The first test took place from the 25th August. 24 cages divided into 4 batches A, B, C, and T, each of 6 cages, were used. In all cases the composition of the syrup is the same. This syrup contains 80% of dry substances and is formed as to ⅔ of syrup originating from the enzymatic hydrolysis of maize (dry substances containing 68% of maltose, 21% of maltotriose, 2.5% of glucose, 8% of polysaccharides) and as to ⅓ of glucose syrup (dry substances containing 95% of glucose).

For batches A, B, C, and T, there was added to the syrup 0.1, 0.2, 1 and 0% (control), respectively, of concentrate, containing 50% of dry substances, of a steeping water or liquor, analysis of which shows approximately the following composition in the dry substances:

| | |
|---|---|
| Total acidity | 24% |
| (of which lactic acidity = 20%) | |
| Total nitrogen | 7.4% |
| Amino nitrogen | 2.6% |
| Residue on calcination | 20% |
| Phosphorus | 3.5% |
| Iron | 300 mg/kg |
| Copper | 10 mg/kg |
| Manganese | 40 mg/kg |
| Zinc | 100 mg/kg |

The pH of this steeping water is about 4; the nitrogen is distributed therein approximately as to ⅓ in the proteins and as to ⅔ in various amino acids, the most abundant of which are glutamic acid, alanine, proline and leucine. This steeping water contains other elements, among which in particular there are vitamins of the B group.

The results of this first test are assembled in Table II, which also combines those of a second test begun on the Oct. 14, 1975 and carried out under the same conditions, but this time with more considerable contents of steeping water of 1, 2, 5 and 10%, respectively, of the feeding product for the batches designated by the letters E, F, G and H.

Table II

| Feeding Product | Steeping water % | Half-life Average duration in days | Standard deviation |
|---|---|---|---|
| A | 0.1 | 44.17 | 20.85 |
| B | 0.2 | 45.50 | 10.89 |
| C = E | 1 | 62.67 | 6.65 |
| F | 2 | 60.83 | 4.49 |
| G | 5 | 48.00 | 6.78 |
| H | 10 | 36.50 | 6.06 |
| T | 0 | 45.17 | 14.16 |

On examining the Table, it is found at first that the addition, when it remains small, has practically speaking no effect on the average length of life of the bees. This is the case with the first two batches (0.1 and 0.2% of steeping water). On the other hand, an addition of 1 or 2% of steeping water concentrate manifests itself by an increase of about 30% in the half-length of life. The low value of the standard deviation calculated shows the concordance of the results and fully enables it to be concluded that the tested composition is effective on the behaviour of bees.

Finally, the results show that after passing through a maximum, the length of life decreases if the proportion of steeping water is further increased.

It will be pointed out that in the course of similar tests, in which the bees were fed with saccharose syrup, it was not possible to achieve a longevity comparable to that obtained with the product according to the invention.

Thus, due to the invention, a product for feeding bees is available which has excellent features, both from the point of view of its use and of its cost and of the results that it enables to be achieved.

We claim:

1. A method for feeding bees which comprises feeding bees a composition comprising a syrup of maltose which is the product of enzymatic hydrolysis of starch, the maltose content of which is at least 40% by weight whereby the product does not crystallize and is free from toxic subtances.

2. The method according to claim 1, additionally comprising a composition compatible with said maltose syrup, and the amount of maltose syrup in said product being sufficient for said product not to crystallize.

3. The method according to claim 2, wherein said compatible composition is a syrup comprising sugars selected from glucose, isomerized glucose, fructose and saccharose.

4. The method according to claim 1, wherein said maltose syrup has the following composition by weight on a dry basis:

| | |
|---|---|
| maltose | 68% |
| maltotriose | 21% |
| glucose | 2.5% |
| polysaccharides | 8%. |

5. The method according to claim 4, comprising about 2 parts of said maltose syrup and about 1 part of a syrup containing glucose.

6. The method according to claim 4, having a water content of about 20% and comprising about 2 parts of said maltose syrup and 1 part of a syrup containing glucose, and containing 1 to 2% of maize steep water having a content of dry substances of about 50%.

7. The method according to claim 1, having a total content of dry substances between about 70 and 85%.

8. The method according to claim 1, additionally comprising substances, other than carbohydrates, of nutritional value for bees and essentially comprising amino acids, proteins, organic acids and vitamins, at levels of enrichment substantially close to those of natural honeys, said substances being provided at least in part by maize steep water.

9. The method according to claim 8, wherein said steep water has been previously concentrated to a content of dry substances of the order of 50% and constitutes from 0.5 to 5% of said product.

10. The method according to claim 1, additionally comprising saccharose, isomerized glucose or a mixture thereof.

11. Feeding product for bees, comprising a syrup of maltose and containing maize steep water in a quantity such that the content of substances other than carbohydrates corresponds approximately to that of the same substances in natural honey.

12. Product according to claim 11, wherein the content of reducing sugars in the dry substance of said steep water is at most 2.5%.

13. Product according to claim 11, wherein the dry substance of said steep water has approximately the following composition:

| | |
|---|---|
| total acidity | 24% |
| (of which lactic acidity = 20%) | |
| total nitrogen | 7.4% |
| amino nitrogen | 2.6% |
| residue on calcination | 20% |
| phosphorus | 3.5% |
| iron | 300 mg/kg |
| copper | 10 mg/kg |
| manganese | 40 mg/kg |
| zinc | 100 mg/kg. |

* * * * *